United States Patent
Finn, Jr.

[15] 3,680,341
[45] Aug. 1, 1972

BEST AVAILABLE COPY

[54] METHOD AND APPARATUS FOR RECONDITIONING A DRUM OF A REPRODUCING MACHINE

[72] Inventor: George P. Finn, Jr., Cincinnati, Ohio

[73] Assignee: Flaturn Inc., Cincinnati, Ohio

[22] Filed: Dec. 30, 1970

[21] Appl. No.: 102,664

[52] U.S. Cl. .........................72/125, 29/401, 72/367
[51] Int. Cl. ................................................B21d 3/02
[58] Field of Search..........72/123, 124, 125, 126, 84, 72/85, 367; 29/401

[56] References Cited

UNITED STATES PATENTS

| | | | |
|---|---|---|---|
| 2,470,005 | 5/1949 | Vilter | 72/123 |
| 2,835,308 | 5/1958 | Stary | 72/126 |
| 2,933,124 | 4/1960 | Benson | 72/123 |
| 3,016,083 | 1/1962 | Klingenberg | 72/126 |
| 3,029,668 | 4/1962 | Wilman | 72/123 |
| 3,191,417 | 6/1965 | Adam | 72/126 |

Primary Examiner—Charles W. Lanham
Assistant Examiner—Gene P. Crosby
Attorney—Marechal, Biebel, French & Bugg

[57] ABSTRACT

A drum of a reproducing machine, includes a cylindrical tube which has an outer surface of predetermined length and diameter and end portions with counterbores for receiving end support hubs. When the outer surface is damaged or is undersized, the tube is reconditioned by first tuning the center portion of the outer surface to a predetermined diameter and then expanding the tube both radially and axially within a rotating hollow arbor by feeding a plurality of circumferentially spaced rollers axially into the tube. The ends of the tubes are faced to remove the expanded counterbored end portions and to reduce the tube to the predetermined length. New counterbores are formed within the faced ends of the tube, and the outer surface of the tube is finished to the predetermined outer diameter.

15 Claims, 11 Drawing Figures

PATENTED AUG 1 1972  BEST AVAILABLE COPY  3,680,341
SHEET 1 OF 2
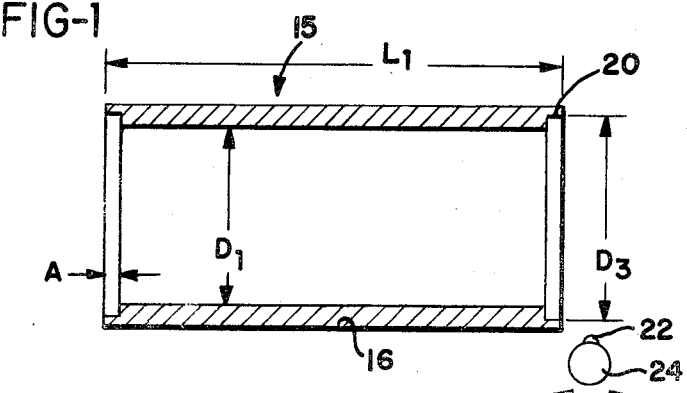
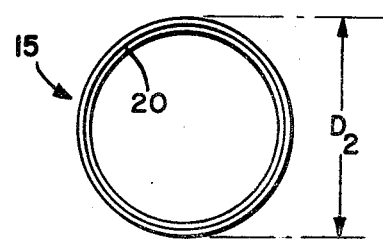
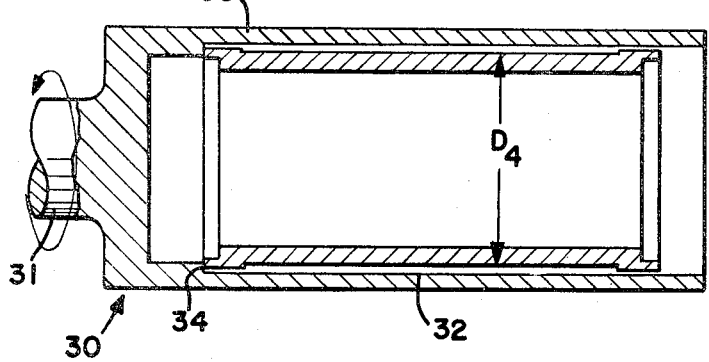
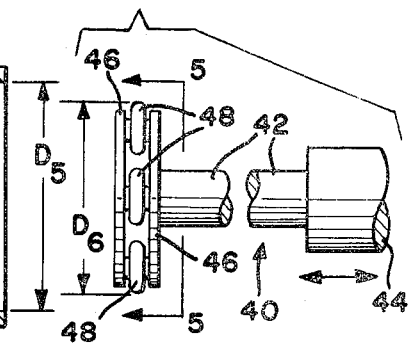
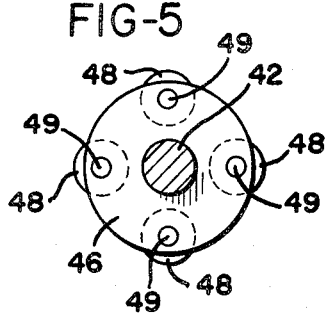
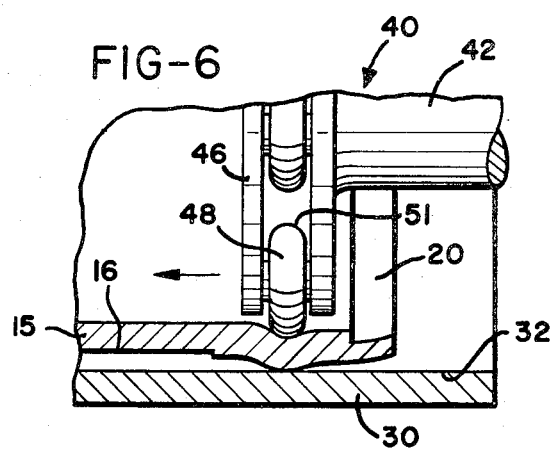
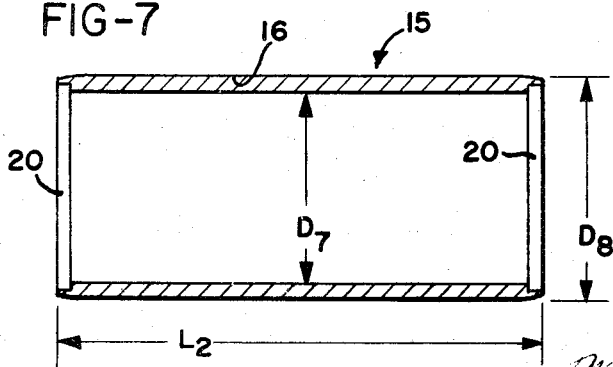
INVENTOR
GEORGE P. FINN, JR.
BY
Marechal, Biebel, French & Bugg
ATTORNEYS

METHOD AND APPARATUS FOR RECONDITIONING A DRUM OF A REPRODUCING MACHINE

BACKGROUND OF THE INVENTION

This invention relates to the reconditioning of a metal tube and is particularly suited for reconditioning a thin walled tube which may be made of a relatively expensive material and which may be damaged either during use, or even before it is used from various causes. Typical damage might be scratching, pitting, minor denting, or other damages to the tube, particularly to its outer surface. In other cases, metal tubes may be available from a tube manufacturer only in certain standard sizes, and there may be a particular need for a tube having a non-standard diameter or wall thickness. If a standard tubular piece can be reconditioned to the desired dimension, this may provide a less expensive and quicker means of achieving the desired piece, without need to set up special manufacturing techniques. Thus, there is at present a need for a simple reconditioning process and apparatus to permit the reuse of damaged tubular pieces employed in the fabrication of drums in certain reproducing or copying machines.

In a xerographic reproducing machine such as disclosed in U.S. Pat. No. 3,062,095, a hollow cylindrical drum is employed for transferring an electrostatically coated image to a copy paper. The drum includes a cylindrical tube which has a specified length and outer diameter which must be held precisely within predetermined tolerances, and the smooth cylindrical outer surface of the tube is coated with selenium. A counterbore is formed within each end portion of the tube, and a pair of hubs or spiders are inserted into the counterbores. The assembly of the coated tube and the hubs, forming the drum, is adapted to receive a horizontal spindle which supports the drum for rotation within the reproducing machine.

During the initial assembly or repairing of such a machine, or during use of the machine, frequently the outer selenium coated surface of the drum is inadvertently scratched. If the scratch is very minor, attempts are sometimes made to polish the scratch out of the selenium coating or the coating might be removed and replaced with a new coating. However, when the scratch penetrates through the selenium coating and into the outer surface of the tube, it is common to scrap the drum.

SUMMARY OF THE INVENTION

The present invention is directed to a novel method and apparatus particularly adapted for reconditioning a cylindrical tube of a drum used in a reproducing machine and which provides for increasing the outer diameter of the tube and for providing a new outer surface on the tube. Thus the present invention provides for processing a tube in a manner which is effective to remove a damaged area from the outer surface of the tube without changing the outer diameter of the tube. As a result of the invention, the only apparent change in a reconditioned tube from an original tube is an increase of the inner diameter of the tube and a slightly thinner wall thickness.

In accordance with one embodiment of the invention, a scrapped tube having counterbored end portions and a damaged outer surface, is turned on a lathe while the inner surface of the tube is supported by an expanded mandrel, to reduce the center portion of the outer diameter of the tube to a predetermined base diameter and to provide the tube with a uniform wall thickness. The tube is then inserted into the open end of a hollow cylindrical arbor which has an inner diameter greater than the finally desired outer diameter for the tube.

While the tube is confined within the rotating arbor, an expanding tool including a plurality of circumferentially spaced rollers, is fed axially into the tube causing the tube to expand both radially and axially by predetermined amounts. Preferably, the expanding tool is fed rapidly through the end portions of the tube and at a slower rate through the center portion to produce a relatively higher percentage of axial expansion from the center portion of the tube. In addition, the expanding tool may be passed into or through the drum more than one time, and between each pass, the tube may be removed from the arbor and reversed end for end. After the tube is expanded, the counterbored end portions of the tube are removed by clamping the tube in a stationary fixture and then feeding a rotating facing tool axially into engagement with each end portion of the tube.

New counterbores are formed within the faced end portions of the tube by clamping the tube within a stationary fixture and feeding rotating counterboring tools axially into the ends of the tube. The outer surface of the tube is rough turned on a lathe and is subsequently finished precisely to a predetermined outer diameter while the tube is supported by rotating chucks with engage the counterbores within the ends of the tube.

BRIEF DESCRIPTION OF THE DRAWINGS

FIG. 1 is an axial section of a scrapped tube intended for use in a reproducing machine and which is to be reconditioned in accordance with the present invention;

FIG. 2 is an end view of the tube shown in FIG. 1;

FIG. 3 is a somewhat diagrammatic axial section of apparatus used for expanding the tube shown in FIGS. 1 and 2;

FIG. 4 is a somewhat diagrammatic fragmentary elevational view of an expanding tool which is used for expanding the tube shown in FIG. 3;

FIG. 5 is a section view taken on the line 5—5 of FIG. 4;

FIG. 6 is an enlarged fragmentary section of a tube being expanded;

FIG. 7 is an axial section of an expanded tube;

DESCRIPTION OF THE PREFERRED EMBODIMENT

Figure 8:
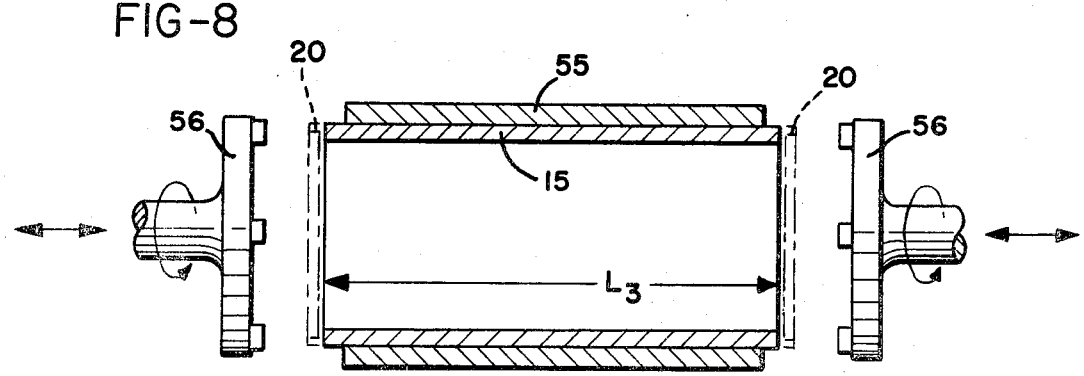
FIG. 8 illustrates diagrammatically apparatus for removing the counterbored end portions of an expanded tube.

The tube 15 shown in FIGS. 1 and 2 is formed from aluminum tubing and is used to produce a drum intended for use on a xerographic reproducing machine. The tube 15 has a cylindrical configuration with a predetermined inner diameter $D_1$, a predetermined length $L_1$, and an outer cylindrical surface 16 having an outer diameter $D_2$. A counterbore 20 is formed within each end portion of the tube 15 and has a predetermined inner diameter $D_3$ and a predetermined depth A.

In accordance with the present invention, when the outer surface 16 is damaged by a scratch or a dent, the tube is reconditioned by first turning the outside diameter of the tube with a tool bit 22 which is fed axially on a carriage 24 along the outer surface of the tube while the tube is supported by a rotary expansion arbor (not shown) engaging the inner surface of the tube. Preferably, only the center portion, between about two inches in from each end, is turned on the lathe to reduce the diameter of this portion of the outer surface 16 of the tube to a predetermined base diameter $D_4$ and to assure that this portion of the tube has a uniform wall thickness.

The turned tube 15 is then inserted into the open end of a hollow cylindrical arbor 30 which is supported for rotation by a shaft 31 connected to a suitable drive motor (not shown). The arbor 30 includes an inner cylindrical surface 32 which has a predetermined diameter $D_5$ greater than the diameter $D_4$. The cylindrical surface 32 cooperates with a smaller diameter cylindrical surface 33 to define an annular radial shoulder 34 which forms an abutment or stop for the inner end of the tube 15. While the tube 15 and arbor 30 are rotating at a predetermined speed, for example, 120 rpm, an expanding tool 40 (FIG. 4) is fed axially into the tube.

The expanding tool 40 includes an elongated rod 42 which has one end secured to a carriage 44 supported for axial movement. The opposite end of the rod 42 supports a pair of parallel spaced radially extending disks 46. A set of four or more circumferentially spaced rollers 48 are positioned between the disks 46, and each roller 48 is supported by an anti-friction bearing mounted on a corresponding stub shaft 49. The outer surface 51 of each roller 48 is curved at a radius of about one-half inch, and the overall effective diameter $D_6$ of the rollers 48 on the expanding tool 40 is slightly greater than the inner diameter $D_1$ of the tube 15.

Referring to FIG. 6, when the expanding tool 40 is fed axially into the tube 15 while the tube 15 is confined within the arbor 30 rotating at a speed of about 120 rpm, the tube 15 expands radially until the outer surface 16 of the tube engages the inner cylindrical surface 32 of the arbor 30. As the tool 40 is passed, the tube contracts radially due to the somewhat elastic memory of the aluminum material. As a result of the fact that the difference in the diameters $D_5$ and $D_6$ is less than the difference in the diameters $D_4$ and $D_1$, and the fact that the tube seats on the annular shoulder 34 within the arbor 30, the wall thickness of the tube is reduced during the radial expanding operation, due to incremental cold working and displacement of the material axially towards the open end of the arbor and a corresponding increase in the length of the tube.

Preferably, the expanding tool 40 is first fed axially about two inches into one end portion of the rotating tube within the arbor 30 and at a relatively fast feed rate to effect primarily radial expansion of the end portion of the tube. The tube is then removed from the arbor, reversed end for end and reinserted within the arbor. The expanding tool is fed rapidly through the opposite end portion of the tube to obtain primarily radial expansion within this portion, and is then fed through the center portion by the tube at a slower rate to effect a combination of ring rolling and shear forming or axial expansion of the center portion of the tube. The tube may then be reversed end for end and inserted back into the arbor 30, and expanding tool 40 is fed again at a relatively faster rate through the center portion of the rotating tube. As a result of this procedure, the tube is expanded uniformly both radially and axially to produce a predetermined outer diameter $D_8$ (FIG. 7), a predetermined inner diameter $D_7$ and a predetermined length $L_2$. Furthermore, as a result of the relatively slower axial feeding of the expanding tool within the center portion of the tube, the axial expansion of the tube due to shear forming is obtained primarily from the center portion of the tube so that maximum wall thickness can be maintained within the end portions of the tube. The difference in the final outer diameter $D_8$ of the expanded tube and the inner diameter $D_5$ of the arbor 30 provides sufficient clearance to permit the tube to be easily removed from the arbor 30 after the tube is expanded.

Due to the counterbores 20 within the end portions of the tube 15, it can be seen from FIGS. 6 and 7 that the end portions of the expanded tube become slightly crowned or curved since the rollers 48 of the expanding tool 40 do not engage the counterbores 20. As mentioned above, it also can be seen from FIGS. 3 and 4 that the inner diameter of the cylindrical surface 33 within the arbor 30 is greater than the overall diameter $D_6$ of the rollers 48 so that the rollers may be fed completely through the tube during passes of the expanding tool 40 through the tube.

Referring to FIG. 8, after the tube 15 is expanded both radially and axially, the tube 15 is clamped in a surrounding fixture 55, and each counterbored end portion of the expanded tube is removed by a corresponding rotating facing tool 56 which is fed axially into engagement with the end portion of the tube. While the counterbored end portions of the expanded tube may be removed by rotating the tube and feeding a cutoff tool radially into the tube, preferably the tube is held stationary within the fixture 55, and the facing tools 56 are fed axially against the ends of the tube to assure that the end surfaces of the tube are square with the tube axis and to prevent the formation of a burr on each end of the tube. The facing operation (FIG. 8) is also effective to reduce the length of the tube to a predetermined length $L_3$.

Figure 9:
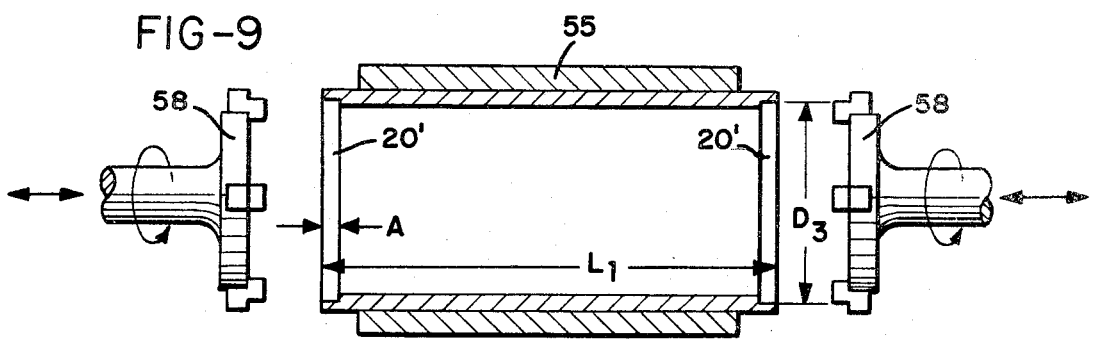
FIG. 9 illustrates diagrammatically apparatus for forming new counterbores within the faced end portions of an expanded tube.

After the facing operation illustrated in FIG. 8, the tube is clamped within another retaining fixture 55 (FIG. 9) mounted on the bed of a dual spindle boring machine, and a counterboring tool 58 is fed axially into each end portion of the tube to form a new counterbore 20'. The counterboring tools 58 form the new counterbores 20' according to the original predetermined inner diameter $D_3$ and depth A and also reduce the tube axially to the original length $L_1$.

Figure 10:
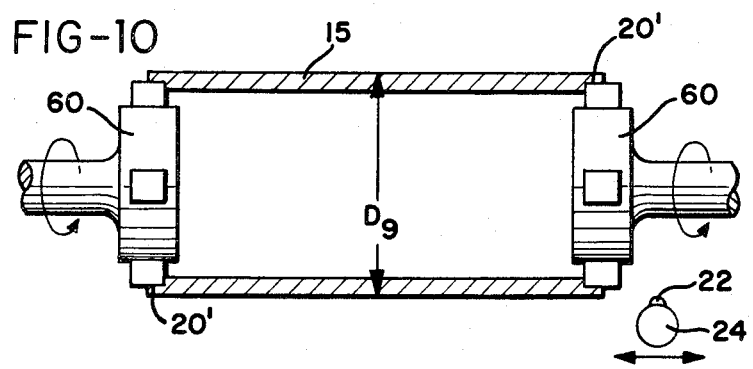
FIGS. 10 and 11 illustrate diagrammatically apparatus for rough turning and finishing the outer surface of an expanded tube.
Figure 11:
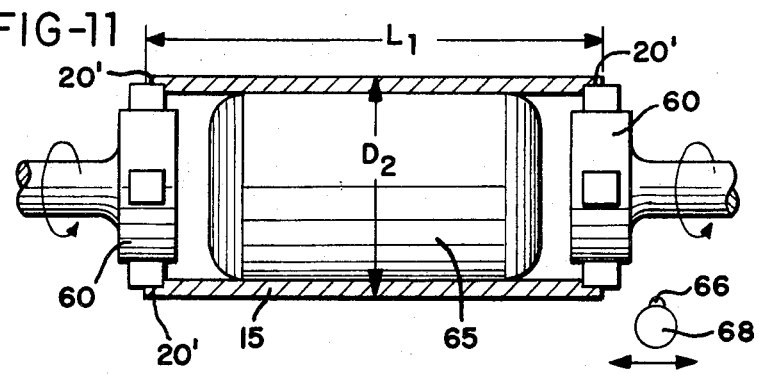

In reference to FIG. 10, after the new counterbores 20' are formed within the end portions of the expanded tube, the tube is positioned between opposing chucks 60 of a lathe, and the chucks engage the counterbores 20' so that the expanded tube is supported for rotation on its axis. The outer surface of the expanded tube is then turned by the tool 22 which is fed axially by the carriage 24 to reduce the outer diameter of the drum to a predetermined diameter $D_9$.

As the final operation, after the outer surface of the expanded tube is rough turned as illustrated in FIG. 10, a vibration dampening plug 65 is placed within the tube which is then mounted on another set of opposing chucks 60 of another lathe. The outer surface of the expanded tube is then finished with a diamond tool 66 which is mounted on an axially movable carriage 68. The finish turning of the expanded tube with the diamond tool 66 is effective to reduce the outer diameter of the tube back to the origonal diameter $D_2$ and to provide the outer surface with a mirror-like finish. The finished tube may then be coated with selenium in the same manner as the original drum was coated.

From the drawings and the above description, it is apparent that a method and apparatus for reconditioning a tube in accordance with the present invention provides desirable features and advantages. For example, the present invention provides for reconditioning a tube having a damaged outer surface so that the tube may be reused to form a drum for a xerographic reproducing machine. As a result, substantial economies are obtained by eliminating the scrapping of drums solely because the tube has a damaged or an undersized outer surface.

More specifically, the invention provides for expanding a scrapped tube both radially and axially to enable the damaged area on the outer surface of the tube to be removed without reducing the desired outer diameter of the tube and to permit new counterbores to be formed within the end portions of the tube. The only dimensional difference between a reconditioned tube and the original tube is the difference between the inner diameters $D_1$ and $D_7$. However, since the drum which is produced from a reconditioned tube is supported in a reproducing machine by hubs or spiders which engage the new counterbores 20' within the end portions of the tube, the increased inner diameter of the tube has no effect on the function of the drum. Furthermore, it has been found that the expansion of a tube between the arbor 30 and the expanding tool 40 is effective to compact the grain structure of the aliminum so that even though the wall thickness of the tube reduces, there is no significant reduction in the wall strength of a reconditioned tube.

An additional feature is provided by first turning the center portion of the outer surface of the tube while the inner surface of the tube is supported by an expandable mandrel. That is, this operation provides the tube with a uniform wall thickness so that when the tube is expanded, the expansion will be uniform and the tube will not bow. The faster feeding of the expanding tool within the end portions of the tube is also effective to produce primarily ring rolling or radial expansion of the end portions so that maximum wall thickness can be retained within the end portions for receiving the new counterbores 20'.

While the method herein described, and the form of apparatus for carrying this method into effect, constitute preferred embodiments of the invention, it is to be understood that the invention is not limited to this precise method and form of apparatus, and that changes may be made in either without departing from the scope and spirit of the invention which is defined in the appended claims. For example, it is within the scope of the invention to provide the expanding tool 40 with means for adjusting the radial positions of the rollers 48 while the tool 40 is being fed axially within a tube to effect a change in the effective diameter $D_6$ and a corresponding change in the extent of radial expansion of the tube during the pass of the tool.

What is claimed is:

1. A method of reconditioning a hollow metal drum of a reproducing machine, said drum including a tube having a predetermined length and a damaged outer cylindrical surface of predetermined outer diameter, comprising the steps of expanding the tube both radially and axially to increase its outer diameter beyond said predetermined outer diameter and to elongate the tube beyond said predetermined length, facing the end portions of the tube to reduce the length of the tube back to said predetermined length, and forming on the tube a new outer surface to said predetermined diameter.

2. A method of reconditioning a metal drum of a reproducing machine, said drum including a tube having a predetermined length and a damaged outer cylindrical surface of predetermined outer diameter and counterbores of predetermined inner diameter within the end portions of the tube, comprising the steps of expanding the tube both radially and longitudinally to increase its outer diameter beyond said predetermined outer diameter and to elongate the tube beyond said predetermined length, removing metal from each said end portion of the tube to reduce the length of the tube back to said predetermined length and to remove each said counterbore, forming a new counterbore in each said end portion of the tube, and forming a new outer surface on the tube.

3. A method of reconditioning a metal tube adapted for use in a reproducing machine and having a predetermined length and an outer cylindrical surface of predetermined outer diameter, comprising the steps of confining the tube within a hollow arbor having a cylindrical inner surface with a diameter greater than said outer diameter of said tube, expanding the tube both radially and longitudinally within said arbor by rotatably cold working the tube to increase its outer diameter beyond said predetermined outer diameter and to elongate the tube beyond said predetermined length, removing the expanded tube from said arbor, and forming a new outer surface on the tube.

4. A method as defined in claim 3 including the step of removing metal from said outer surface of said tube while supporting said tube with a mandrel engaging the inner surface of said tube and before inserting said tube into said arbor for enlarging said outer surface to a predetermined diameter correlated to said inner diameter of said arbor and for providing said tube with a substantially uniform wall thickness to assure uniform expansion of said tube within said arbor.

5. A method of reconditioning a cylindrical metal tube adapted for use in a reproducing machine and having a predetermined length and inner and outer diameters, comprising the steps of inserting said tube within a hollow arbor having a cylindrical inner surface with a diameter greater than said outer diameter of said tube, selecting an expanding tool having a plurality of circumferentially spaced rollers defining an effective outer diameter greater than said inner diameter of the tube, effecting relative rotation between said arbor and said expanding tool, feeding said expanding tool axially into the tube while the tube is confined within said arbor to expand the tube both radially and longitudinally by decreasing the radial wall thickness of said tube, removing said expanding tool from the tube, and removing the expanded tube from said arbor.

6. A method as defined in claim 5 and further comprising removing metal from only the center portion of the outer surface of the tube prior to inserting the tube within the arbor to form the tube with end portions having a wall thickness greater than that of the center portion of the tube.

7. A method as defined in claim 5 including the steps of reversing the tube end for end after the tube is removed from said arbor, replacing said tube within said arbor, and feeding said rollers axially into the tube again.

8. A method as defined in claim 5 including the step of feeding said expanding tool through the center portion of the tube at a rate slower than the rate of feeding said tool through the end portions of the tube to effect a greater percentage of longitudinal expansion within the center portion of the tube.

9. A method of reconditioning a metal tube of a reproducing machine, the tube having a predetermined length and a damaged outer cylindrical surface of predetermined outer diameter and including counterbores of predetermined inner diameter within the end portions of the tube, comprising the steps of expanding the tube both radially and longitudinally to increase its outer diameter beyond said predetermined outer diameter and to elongate the tube beyond said predetermined length, removing metal from each said end portion of the tube to reduce the length of the tube back to substantially said predetermined length and to remove each said counterbore, forming a new counterbore of said predetermined inner diameter in each said end portion of the tube, and forming a new outer surface on the tube.

10. A method as defined in claim 9 wherein said step of expanding said tube is effective to lengthen said tube axially by a distance equal to at least the combined axial length of said counterbores.

11. A method of reconditioning a metal tube of a reproducing machine, the tube having a predetermined length and a damaged outer cylindrical surface of predetermined outer diameter and including counterbores of predetermined inner diameter within the end portions of the tube, comprising the steps of removing metal from the center portion of the outer surface of the tube while the tube is rotatably supported by a mandrel engaging the inner surface of the tube to provide the tube with a uniform wall thickness, inserting the tube into a hollow arbor having a cylindrical inner surface with a diameter greater than said outer diameter of said tube, selecting an expanding tool having a plurality of circumferentially spaced rollers defining an effective outer diameter greater than said inner diameter of the tube, effecting relative rotation between said arbor and said expanding tool, feeding said expanding tool axially into the tube while the tube is confined within said arbor to expand the tube both radially and longitudinally by decreasing the radial wall thickness of said tube, removing said expanding tool from the tube, removing the expanded tube from said arbor, removing metal from each said end portion of the tube to reduce the length of the tube back to substantially said predetermined length and to remove each said counterbore, forming a new counterbore of said predetermined inner diameter in each said end portion of the tube, and forming a new outer surface on the tube.

12. A method as defined in claim 11 wherein the expanding tool is first fed axially into only one end portion of the tube, the tube is then reversed end for end in said arbor and the tool is fed axially through the tube with the rate of feed of the tool being slower within the center portion of the tube than within the end portions of the tube.

13. Apparatus for use in reconditioning a metal tube having a predetermined length and outer diameter, comprising a hollow arbor including an inner cylindrical surface having a diameter greater than said outer diameter of the tube and adapted to receive the tube, means forming an inner stop surface within said arbor to limit axial movement of the tube, an expanding tool including a plurality of circumferentially spaced rollers, means supporting said tool for axial movement into the tube within said arbor, means for producing relative rotation between said arbor and said expanding tool, said rollers defining an effective outer diameter greater than the inner diameter of the tube to produce radial expansion of the tube, and the difference between said inner diameter of the arbor and said outer effective diameter of the rollers being less than the difference in the inner and outer diameters of the tube to produce also axial expansion of the tube within said arbor in response to feeding said tool into the tube.

14. Apparatus as defined in claim 13 wherein said means forming said inner stop surface comprises an annular shoulder within said arbor.

15. Apparatus as defined in claim 13 wherein said means for producing relative rotation comprises a cantilever rotatable support for said arbor.

* * * * *